United States Patent [19]

Harada et al.

[11] 3,923,926

[45] Dec. 2, 1975

[54] THIXOTROPIC POLYURETHANE COMPOSITION

[75] Inventors: Hideo Harada; Akinobu Ichihara; Yasuro Ohmori, all of Kyoto, Japan

[73] Assignee: Dai-Ichi Kogyo Seiyaku Co., Ltd., Kyoto, Japan

[22] Filed: Jan. 29, 1974

[21] Appl. No.: 437,686

[52] U.S. Cl. ........................ 260/77.5 AP; 260/37 N; 260/77.5 AQ; 260/77.5 AM
[51] Int. Cl.$^2$ .......................................... C08G 18/32
[58] Field of Search ............... 260/77.5 AP, 77.5 AQ, 260/77.5 AM

[56] References Cited
UNITED STATES PATENTS
3,380,967  4/1968  Lowe et al. .................. 260/77.5 AP OTHER PUBLICATIONS
Saunders et al., Polyurethanes, Part II, Interscience, N.Y., 1964, pp. 532 and 534.

*Primary Examiner*—M. J. Welsh
*Attorney, Agent, or Firm*—Armstrong, Nikaido & Wegner

[57] ABSTRACT

The thixotropic polyurethane composition comprises: a liquid of a polyurethane prepolymer having at least two terminal free isocyanate groups and a block polyether compound having at least two terminal secondary alcohol groups. The block polyether compound is a reaction product obtained by addition polymerization of ethylene oxide and propylene oxide in a block form to a starting material having two or three terminal active hydrogen groups in such a polymerization degree that said block polyether compound includes 30 to 409 moles of ethylene oxide and 3 to 172 moles of propylene oxide per molecule and the molar ratio between ethylene oxide and propylene oxide is within the range of 1 : 0.05 to 1 : 0.5. The thixotropic polyurethane composition may further include an inorganic material for enhancing the thixotropic property.

11 Claims, No Drawings

THIXOTROPIC POLYURETHANE COMPOSITION

BACKGROUND OF THE INVENTION

This invention relates to improved polyurethane compositions and more particularly to thixotropic polyurethane compositions. This invention also relates to a method for preparing such the thixotropic polyurethane compositions.

It is known that polyurethane is superior in rubber-like elasticity, weather resistance, abrasion resistance and chemical resistance. For this reason polyurethane is widely used for various uses, for example, as an elastomer, a coating material, paint, sealant, waterproof filming agent, flooring material, wall material, synthetic leather and adhesive. In order to apply polyurethane to various objects for the above-mentioned purposes, a paste or liquid composition comprising a polyurethane prepolymer in a liquid phase or a solution of a polyurethane prepolymer is used. However, the conventional compositions for this purpose are of fluidity. Accordingly, if any of those compositions is applied to a vertical surface as a sealant or waterproof filming agent, it will flow down so that a good finishing cannot be expected. It is, therefore, required that the polyurethane prepolymer compositions have a good thixotropic property for a good workability.

In order to prepare a thixotropic polyurethane composition, an attempt was made to cause a polyurethane-area bridging utilizing both polyether glycol and diaminodiphenyl methane. Another attempt was made to add finely divided silica to a polyurethane prepolymer composition. Further, Japanese Pat. Publication No. 41,110 of 1970 published December 23, 1970, discloses a thixotropic polyurethane composition which comprises a polyurethane prepolymer in a liquid phase or a solution of a polyurethane prepolymer, polyethylene glycol having an average molecular weight of 100 to 20,000 and colloidal silica. These known thixotropic polyurethane compositions are disadvantageous in that if they are prepared on an industrial scale, their quality is not uniform and that the polyurethane prepolymers obtained are unstable for storing and gelated for a short period. Particularly, the thixotropic polyurethane composition including polyethylene glycol having an average molecular weight of 100 to 20,000 as disclosed in Japanese Pat. Publication No. 41,110 of 1970 is inferior in the storing stability and causes an increase in hardness and a decrease in elasticity due to introduction of a single polyoxyethylene chain in addition to affection by terminal primary alcohol groups, with the result of this composition is not so good for use as thixotropic grouting material, waterproofing material and walling materials.

The primary object of the invention is, therefore, to provide an improved polyurethane composition having a good thixotropic property.

Another object of the invention is to provide a thixotropic polyurethane which has a good storage stability.

A further object of the invention is to provide a thixotropic polyurethane in which the disadvantages inherent to the conventional thixotropic polyurethane compositions can be avoided.

A still further object of the invention is to provide an improved method for preparing a thixotropic polyurethane composition.

Other objects and advantages of the invention will become apparent from the following detailed description of the invention.

SUMMARY OF THE INVENTION

According to the invention the improved thixotropic polyurethane composition comprises (a) a liquid of polyurethane prepolymer having at least two terminal free isocyanate groups and (b) a block polyether compound having at least two terminal secondary alcohol groups. The block polyether compound is a reaction product obtained by addition polymerization of ethylene oxide and propylene oxide in a block form to a starting material having two or three terminal active hydrogen groups in such a polymerization degree that the block polyether compound includes 30 to 409 moles of ethylene oxide and 3 to 172 moles of propylene oxide per molecule and the molar ratio between ethylene oxide and propylene oxide is within the range of 1:0.05 to 1:0.5.

The polyurethane prepolymer may be a reaction product obtained by addition polymerization of a polyisocyanate to an active hydrogen compound. Preferably, the polyurethane prepolymer has an average molecular weight within the range of 50 to 10,000. The liquid of a polyurethane prepolymer used in the invention may be either a polyurethane prepolymer in a liquid phase or a solution of a polyurethane prepolymer in an organic solvent.

In a preferred embodiment of the invention the polyurethane composition includes the above-mentioned block polyether compound in an amount of 0.01 to 50 parts by weight per 100 parts of the polyurethane component of the prepolymer.

In a further preferable embodiment an inorganic material such as finely divided silica or bentonite may be added to the polyurethane composition to enhance its thixotropic property.

DETAILED DESCRIPTION OF THE INVENTION

As described before, the thixotropic polyurethane composition according to the invention comprises a liquid or polyurethane prepolymer having at least two terminal free isocyanate groups and a block polyether compound having at least two terminal secondary alcohol groups. The polyurethane prepolymer having at least two terminal free isocyanate groups is a reaction product obtained by addition polymerization of a polyisocyanate to an active hydrogen compound.

The polyisocyanate which is one of the reactants for obtaining the polyurethane prepolymer is a compound having at least two NCO groups in one molecule. The polyisocyanate may be a member selected from the group consisting of 2,4-tolylene diisocyanate, 2,6-tolylene diisocyanate, m-phenylene diisocyanate, p-phenylene diisocyanate, 1-chlorophenylene-2,4-diisocyanate, 1.5-naphthalane diisocyanate, 3,3'-bistoluene-4,4'-diisocyanate, methylene bisphenylene-4,4'-diisocyanate, tetramethylene diisocyanate, hexamethylene diisocyanate, polyaryl polyisocyanates, dimers and trimers of the foregoing and triisocyanates obtained by the reaction of one mole of a diisocyanate with three moles of a triol such as trimethylolpropane.

The active hydrogen compound to which the above-mentioned polyisocyanate is added may be a member selected from the group consisting of polyols, amines, polyamines and the mixtures thereof and has two to six active hydrogen groups per moleculer and an average moleculer weight between 30 and 300 per said active hydrogen group. Preferably, the active hydrogen compound is a member selected from the group consisting of di- and tri-ols of low molecular weights, such as ethylene glycol, 1,4-butandiol, glycerine, and trimethylol propane; polyalkylene glycols, such as polypropylene glycol and copolymers of ethylene oxide and propylene oxide; polymers obtained by the polymerization of a low moleculer weight triol, such as glycerine, trimethylol propane and 1, 2, 6-hexane triol, a low moleculer weight tetraol, such as pentaerythritol, or a low moleculer weight hexaol, such as sorbitol, with an alkylene oxide, such as ethylene oxide and propylene oxide; amines such as diethanol amine and triethanol amine; polyamines such as ethylenediamine and 4,4'-methylene-bis-1-chloroanilene; and polymers obtained by the polymerization of one of said amines and polyamines with an alkylene oxide such as ethylene oxide and propylene oxide.

The polyurethane prepolymer thus obtained by addition polymerization of a polyisocyanate to an active hydrogen compound may preferably have an average moleculer weight within the range of 500 to 10,000.

The liquid of a polyurethane prepolymer may be either a polyurethane prepolymer in a liquid phase or a solution of a polyurethane prepolymer in an organic solvent. Among the preferred organic solvents there may be included esters such as ethyl acetate, butyl acetate and amyl acetate; ketones such as acetone, methyl ethyl ketone, diethyl ketone and methyl isobutyl ketone; aromatic hydrocarbones such as toluene, benzene and xylene; ethers such as tetrahydrofuran and dioxane; acid amide substitution compounds such as N,N'-dimethyl formamide and N,N-dimethyl acetoamide; and dimethyl sulphoxide.

If polyurethane prepolymer is available in a liquid phase at the normal temperature, it may be used at it is. However, if polyurethane prepolymer is not available in a liquid phase, it is required to use an organic solvent to prepare a solution of polyurethane prepolymer. Acid amide substitution compounds such as N,N'-dimethyl formamide and N,N'-dimethyl acetamide are most preferable for preparing a solution of polyurethane prepolymer.

In order to provide a polyurethane composition with a good thixotropic property, the above-mentioned polyurethane prepolymer solution may preferably be prepared by diluting a polyurethane prepolymer with one of the above-mentioned organic solvents so that the polyurethane prepolymer content in the solution prepared is 25 to 40% by weight of the solution.

The other component of the thixotropic polyurethane composition according to the invention is a block polyether compound having at least two terminal secondary alcohol groups. The block polyether compound is a reaction product obtained by addition polymerization of ethylene oxide and propylene oxide in a block form to a starting material having two or three terminal active hydrogen groups. Addition polymerization of ethylene oxide and propylene oxide to the starting material should be carried out in such a polymerization degree that the obtained block polyether compound includes 30 to 409 moles of ethylene oxide and 3 to 172 moles of propylene oxide per molecule and the molar ratio between ethylene oxide and propylene oxide is within the range of 1:0.05 to 1:0.5.

The starting material may be a member selected from the groups consisting of diols, amines and triols of low molecular weights such as ethylene glycol, propylene glycol, 1,4-butanediol, diethanoleamine, glycerine and trimethylol propane; polyalkylene glycols such as polyethylene glycol; and polyalkylene oxide such as ethylene oxide and propylene oxide.

Addition polymerization of ethylene oxide and propylene oxide to the starting material is carried out in a block form so that the reaction product has at least two terminal secondary alcohol groups. For example, addition polymerization of propylene oxide may be carried out after addition polymerization of ethylene oxide has been completed. Addition polymerization of propylene oxide to the starting material may also be carried out before and after addition polymerization of ethylene oxide. In any cases ethylene oxide and propylene oxide are polymerized in a block form so that the reaction product may have terminal secondary alcohol groups owing to addition polymerization of propylene oxide.

The ethylene oxide component in the block polyether compound should be 30 to 409 moles per molecule. The propylene oxide component in the block polyether compound should be 3 to 172 moles per molecule. The molar ratio between ethylene oxide and propylene oxide in the block polyether compound should be within the range of 1:0.05 to 1:0.5. In case where a compound which includes therein ethylene oxide and/or propylene oxide components, such as polyethylene glycol or an ethylene oxide-propylene oxide copolymer, is used as the starting material, the amounts of those ethylene oxide and/ or propylene oxide components initially included in the starting material should be taken into consideration to determine the amounts of ethylene oxide and propylene oxide components of the obtained block polyether compound.

The block polyether compound which is obtained by successive addition of ethylene oxide and propylene oxide to ethylene glycol as the starting material may be represented by the following formula:

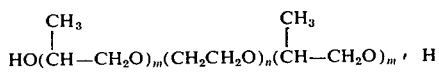

wherein $n$ is 30 to 409, $m+m'$ is 3 to 172 and $n:(m+m')$ 1:0.05 to 1:0.5.

Although applicants do not wish to be bound by any theory of operation of the present invention, it is believed that various factors participate in providing the polyurethane composition according to the invention with a good thixotropic property and a good storage stability. Particularly, it is important that ethylene oxide and propylene oxide chains are polymerized in a block form in the polyether compound with the ethylene oxide and propylene oxide contents being within the before mentioned critical ranges, whereby the polyether compound includes both primary alcohol groups and secondary alcohol groups as terminal groups thereof, with the secondary alcohol group content being 40 to 85% with respect to the total number of the terminal alcohol groups, in addition to the fact that propylene glycol groups are introduced to the compound.

The thixotropic polyurethane composition may be prepared by dissolving the block polyether compound in a liquid polyurethane prepolymer or an organic solvent solution of polyurethane prepolymer to form a mixture. In order to obtain a homogeneous mixture to provide the composition with a good thixogropic property, the mixing of the block polyether compound with a liquid polyurethane prepolymer of a solution of polyurethane prepolymer may preferably be carried out at a temperature within the range of 60° to 120°C and in an atmosphere of an inert gas such as nitrogen gas or carbon dioxide gas.

In order to enhance the thixotropic property furthermore and to more economically prepare the thixotropic polyurethane composition, an inorganic material such as finely divided silica or bentonite amy be added to the composition according to the invention. The amount of the inorganic material added as a thixotropy enhancing agent should be within the range of 0.5 to 10 parts by weight with respect to 100 parts by weight of polyurethane prepolymer included in the polyurethane composition.

Preferably, the thixotropy enhancing inorganic material is first added to a liquid polyurethane prepolymer or a solution of polyurethane prepolymer in an atmosphere of an inert gas such as nitrogen gas or carbon dioxide gas and at a temperature of 100+ to 150°C to form a dispersion system. The block polyether compound is then added to the dispersion system in the same inert gas atmosphere and at a temperature of 60° to 120°C, taking about 5 to 10 minutes for mixing to form a homogeneous thixotropic polyurethane composition.

PREFERRED EMBODIMENT OF THE INVENTION 2,540g of polypropylene glycol glycerol ether having an average molecular weight of 5,000 was reacted with 369 g of a tolylene diisocyanate mixture (comprising 80% by weight of 2,4-tolylene diisocyanate and 20% by weight of 2,6-tolylene diisocyanate) in a nitrogen gas flow atmosphere and at 120°C for 2 hours. To the reaction product liquid 640g of polypropylene glycol having an average moleculer weight of 2,000 was added to carry out the reaction therebetween in a nitrogen gas flow atmosphere and at 120°C for 1 hour. A colorless, transparent prepolymer having a terminal free isocyanate group content of 3.0% by weight was obtained. This prepolymer will be hereinafter referred to as Prepolymer A.

A mixture of 2,480g of polypropylene-ethylene glycol glycerol ether having an average moleculer weight of 5,000 with 620g of polypropylene glycol having an average molecular weight of 2,000 was reacted with 460g of a tolylene diisocyanate mixture (comprising 80% by weight of 2,4-tolylene diisocyanate and 20% by weight of 2,6-tolylene diisocyanate) in a nitrogen gas flow atmosphere and at 120°C for 3 hours. Another colorless, transparent prepolymer having a terminal free isocyanate group content of 3.6% by weight was obtained. This prepolymer will be hereinafter referred to as Prepolymer B.

To 100 parts of Prepolymer A or Prepolymer B various polyester compounds listed in Table 1 were added in the respectively indicated amounts. The mixtures were kneaded in a kneader at 80°C and in a nitrogen gas flow atmosphere for two hours to obtain pasty or greasy compositions.

A slump test was carried out with respect to each of the obtained compositions according to the slump test method for silicone seatants defined in JIS-A-5755-1969 (Japan Industrial Standard Test). The test results are indicated in Table 1 in which "found" in thixotropy indicates for a slump test value of 0 to 1 mm while "not found" in thixotropy indicates for a slump test value of more than 1 mm.

Each of the above mentioned compositions was enclosed with nitrogen gas in a 100 cc vessel and thermostated at 40±0.5°C in a sealing condition for 60 days. After then the appearance of each of the compositions was observed to determine the storage stability. The test results are also indicated in Table 1 in which "good" in storage stability indicates no appreciable change in thixotropy or no gelation while "no good" in storage stability indicates gelation or no thixotropy.

Each of various polyester compounds listed in Table 1 has a CPR (Controlled Polymerization Rate) value of less than 10 measured by JIS-K1557.

Table 1

| Sample Nos. | Polyurethane Prepolymers | | Polyether Compounds | | | | | | Thixotropy | Storage Stability |
| --- | --- | --- | --- | --- | --- | --- | --- | --- | --- | --- |
| | Kinds | Parts by Weight | Starting Materials | Ethylene Oxide (moles) | Propylene Oxide (moles) | Molar Ratio of EO/PO | Parts by Weight | Type of Polymerization | | |
| 1 | A | 100 | Ethylene glycol | 34 | 3.5 | 1:0.1 | 10 | Block | Found | Good |
| 2 | A | 100 | Ethylene glycol | 45 | 3.5 | 1:0.08 | 10 | Block | Found | Good |
| 3 | A | 100 | Ethylene glycol | 68 | 6.9 | 1:0.1 | 10 | Block | Found | Good |
| 4 | A | 100 | Ethylene glycol | 90 | 8.6 | 1:0.1 | 10 | Block | Found | Good |
| 5 | A | 100 | Ethylene glycol | 225 | 10 | 1:0.04 | 10 | Block | Found | No Good |
| 6 | A | 100 | Ethylene glycol | 90 | 0 | 1:0 | 10 | — | Found | No Good |
| 7 | B | 100 | Propylene glycol | 90 | 8.6 | 1:0.1 | 10 | Block | Found | Good |
| 8 | B | 100 | Propylene glycol | 90 | 0 | 1:0 | 10 | — | Found | No Good |
| 9 | B | 100 | Glycerine | 90 | 8.6 | 1:0.1 | 10 | Block | Found | Good |
| 10 | B | 100 | Glycerine | 90 | 1.8 | 1:0.02 | 10 | Random | Not Found | No Good |
| 11 | B | 100 | Glycerine | 90 | 17.2 | 1:0.19 | 15 | Block | Found | Good |
| 12 | B | 100 | Glycerine | 90 | 68.8 | 1:0.8 | 15 | Block | Not Found | No Good |
| 13 | B | 100 | Glycerine | 450 | 0 | 1:0 | 10 | — | Found | No Good |
| 14 | B | 100 | Glycerine | 408 | 34.4 | 1:0.08 | 10 | Block | Found | Good |
| 15 | B | 100 | Glycerine | 225 | 172 | 1:0.8 | 15 | Random | Not Found | No Good |

Table 1-continued

| Sample Nos. | Polyurethane Prepolymers | | Polyether Compounds | | | | | | Thixotropy | Storage Stability |
|---|---|---|---|---|---|---|---|---|---|---|
| | Kinds | Parts by Weight | Starting Materials | Ethylene Oxide (moles) | Propylene Oxide (moles) | Molar Ratio of EO/PO | Parts by Weight | Type of Polymerization | | |
| 16 | A | 100 | Triethanolamine | 90 | 17.2 | 1:0.1 | 10 | Block | Found | Good |
| 17 | A | 100 | Triethanolamine | 450 | 0 | 1:0.04 | 10 | Block | Found | No Good |
| 18 | B | 100 | Triethanolamine | 90 | 8.6 | 1:0.1 | 10 | Block | Found | Good |
| 19 | B | 100 | Triethanolamine | 90 | 68.8 | 1:0.8 | 15 | Block | Not Found | No Good |
| 20 | B | 100 | Triethanolamine | 225 | 172 | 1:0.8 | 15 | Random | Not Found | No Good |

To 100 parts of the before mentioned Prepolymer A or B various thixotropy enhancing inorganic materials listed in Table 2 were added in the respectively indicated amounts in a nitrogen atmosphere and at 100°C to form a mixture. Each of the mixtures was kneaded in a kneader for one hour to form a homogeneous dispersion system. To the dispersion system after being cooled to 80°C various polyester compounds listed in Table 2 were added. The mixtures were kneaded in a kneader at 80°C and in a nitrogen gas flow atmosphere for 10 minutes to obtain pasty or greasy compositions. The slump and storage stability tests as mentioned before were conducted to determine the thixotropic property of each of the compositions. The test results thereof are indicated in Table 2.

Further, an rubber like elasticity test was conducted according to the vulcanized rubber property test defined in JIS-K-6301 with respect to a hardened elastomer obtained by permitting each of the compositions to stand for seven days at room temperature. The test results thereof are also indicated in Table 2.

In Table 2, each of polyether compounds has a CPR value of less than 10 according to JIS-K-1557. Aerozeal No. 200 and Carplex No. 80 used as thixotropy enhancing agents are $SiO_2$ powder available from Japan Aerozeal Co., Ltd. and Shionogi Pharmaceutical Co., Ltd., both of Japan, respectively.

Table 2

| Sample Nos. | Polyurethane Prepolymers | | Polyether Compounds | | | | | | Thixotropy Enhancing Agents | | Thixotropy | Storage Stability |
|---|---|---|---|---|---|---|---|---|---|---|---|---|
| | Kinds | Parts by Weight | Starting Materials | Ethylene Oxide (moles) | Propylene Oxide (moles) | Molar Ratio of EO/PO | Parts by Weight | Type of Polymerization | Kinds | Parts by Weight | | |
| 21 | A | 100 | Ethylene Glycol | 90 | 8.6 | 1:0.1 | 10 | Block | — | 0 | Found | Good |
| 22 | A | 100 | '' | 90 | 8.6 | 1:0.1 | 0.5 | '' | Aerozeal No. 200 | 3.5 | '' | '' |
| 23 | A | 100 | '' | 90 | 8.6 | 1:0.1 | 2 | '' | Carplex No. 80 | 4 | '' | '' |
| 24 | A | 100 | Glycerine | 90 | 1.8 | 1:0.02 | 10 | Random | — | 0 | Not Found | No Good |
| 25 | A | 100 | '' | 90 | 1.8 | 1:0.02 | 10 | '' | Aerozeal No. 200 | 4 | '' | '' |
| 26 | A | 100 | Ethylene Glycol | 90 | 0 | 1:0 | 10 | — | — | 0 | Found | '' |
| 27 | A | 100 | '' | 90 | 0 | 1:0 | 10 | — | Aerozeal No. 200 | 5 | '' | '' |
| 28 | B | 100 | Ethylene Glycol | 90 | 8.6 | 1:0.1 | 10 | Block | — | 0 | Found | Good |
| 29 | B | 100 | '' | 90 | 8.6 | 1:0.1 | 0.5 | '' | Aerozeal No. 200 | 3.5 | '' | '' |
| 30 | B | 100 | Glycerine | 90 | 8.6 | 1:0.1 | 10 | '' | — | 0 | '' | '' |
| 31 | B | 100 | '' | 90 | 8.6 | 1:0.1 | 1.0 | '' | Carp- | 5 | '' | '' |

Table 2-continued

| Sample Nos. | Polyurethane Prepolymers | | Polyether Compounds | | | | | | Thixotropy Enhancing Agents | | | |
|---|---|---|---|---|---|---|---|---|---|---|---|---|
| | Kinds | Parts by Weight | Starting Materials | Ethylene Oxide (moles) | Propylene Oxide (moles) | Molar Ratio of EO/PO | Parts by Weight | Type of Polymerization | Agents Kinds | Parts by Weight | Thixotropy | Storage Stability |
| 32 | B | 100 | '' | 90 | 68.8 | 0.1 | 15 | '' | lex No. 80 — | 0 | Not Found | No |
| 33 | B | 100 | '' | 90 | 68.8 | 0.8 | 15 | '' | Aerozeal No. 200 | 10 | Found | Good '' |
| 34 | B | 100 | Ethylene Glycol | 90 | 8.6 | 0.8 | 10 | '' | — | 0 | '' | Good |
| 35 | B | 100 | '' | 90 | 8.6 | 0.1 | 0.5 | '' | Carplex No. 80 | 3.5 | '' | '' |
| 36 | A+B | 50+50 | Ethylene Glycol | 90 | 8.6 | 0.1 | 10 | Block | — | 0 | Found | Good |
| 37 | A+B | 50+50 | Ethylene Glycol | 90 | 8.6 | 0.1 | 0.5 | Block | Aerozeal No. 200 | 3.5 | Found | Good |
| 38 | A+B | 50+50 | '' | 90 | 8.6 | 0.1 | 1.0 | '' | Carplex No. 80 | 4 | '' | '' |
| 39 | A | 100 | Triethanolamine | 90 | 8.6 | 0.1 | 1.0 | Block | Aerozeal No. 200 | 3.5 | '' | '' |
| 40 | B | 100 | '' | 90 | 8.6 | 0.1 | 1.0 | '' | '' | 3.5 | '' | '' |

| Sample Nos. | Elastomer Properties | | |
|---|---|---|---|
| | Hardness (Shore A) | Elongation (%) | Tensile Strength (Kg/cm²) |
| 21 | 50 | 400 | 25 |
| 22 | 40 | 800 | 15 |
| 23 | 45 | 600 | 20 |
| 24 | 50 | 410 | 15 |
| 25 | 55 | 400 | 20 |
| 26 | 70 | 200 | 20 |
| 27 | 75 | 100 | 15 |
| 28 | 55 | 450 | 23 |
| 29 | 50 | 600 | 20 |
| 30 | 60 | 450 | 25 |
| 31 | 60 | 500 | 27 |
| 32 | 55 | 400 | 20 |
| 33 | 70 | 200 | 15 |
| 34 | 50 | 400 | 20 |
| 35 | 50 | 800 | 26 |
| 36 | 48 | 450 | 20 |
| 37 | 50 | 800 | 25 |
| 38 | 55 | 700 | 25 |
| 39 | 55 | 600 | 24 |
| 40 | 55 | 630 | 25 |

What is claimed is:

1. A thixotropic polyurethane composition comprising:

a. a liquid polyurethane prepolymer having at least two terminal free isocyanate groups and an average molecular weight within the range of 50 to 10,000, said polyurethane prepolymer being obtained by the addition polymerization of a polyisocyanate with an active hydrogen compound, and b. a block polyether compound having both primary alcohol groups and secondary alcohol groups as terminal groups thereof, with the secondary alcohol number content being 40% to 85% with respect to the total number of terminal alcohol groups, said block polyether compound being a reaction product obtained by addition polymerization of ethylene oxide and propylene oxide in a block form to a starting material having two or three terminal active hydrogen groups in such a polymerization degree that said block polyester compound includes 30 to 409 moles of ethylene oxide and 3 to 172 moles of propylene oxide per molecule and the molar ratio is within the range of 1 : 0.05 to 1 : 0.5.

2. A thixotropic polyurethane composition as defined in claim 1, in which said polyisocyanate is a member selected from the group consisting of 2,4-tolylene diisocyanate, 2,6-tolylene diisocyanate, m-phenylene diisocyanate, p-phenylene diisocyanate, 1-chlorophenylene-2,4-diisocyanate, 1.5-naphthalane diisocyanate, 3,3-bistoluene-4,4'-diisocyanate, methylene bisphenylene-4,4'-diisocyanate, tetramethylene diisocyanate, hexamethylene diisocyanate, polyaryl polyisocyanates, dimers and trimers of the foregoing and triisocyanates obtained by the reaction of 1 mole of a diisocyanate with 3 moles of trimethylolpropane.

3. A thixotropic polyurethane composition as defined in claim 1, in which said active hydrogen compound is a member selected from the group consisting of polyols, amines, polyamines and the mixtures thereof and has 2 to 6 active hydrogen groups per molecule and an average molecular weight between 30 and 300 per said active hydrogen group.

4. A thixotropic polyurethane composition as defined in claim 3, in which said active hydrogen compound is a member selected from the group consisting of di- and tri-ols of low molecular weights, selected from the group consisting of ethylene glycol, 1,4-butandiol, glycerine, and trimethylol propane; polyalkylene glycols, selected from the group consisting of polypropylene glycol and copolymers of ethylene oxide and propylene oxide; polymers obtained by the polymerization of a low molecular weight triol, selected from the group consisting of glycerine, trimethylol propane and 1,2,6-hexane triol, a low molecular weight tetraol, selected from the group consisting of pentaerythritol, or a low molecular weight hexaol, selected from the group consisting of sorbitol, with an alkylene oxide, selected from the group consisting of ethylene oxide and propylene oxide; amines selected from the group consisting of diethanol amine and triethanol amine; polyamines selected from the group consisting of ethylenediamine and 4,4'-methylene-bis-1-chloroamiline; and polymers obtained by the polymerization of one of said amines and polyamines with an alkylene oxide selected from the group consisting of ethylene oxide and propylene oxide.

5. A thixotropic polyurethane composition as defined in claim 1, in which said polyurethane prepolymer has an average molecular weight within the range of 500 to 10,000.

6. A thixotropic polyurethane composition as defined in claim 1, in which said liquid polyurethane prepolymer is a polyurethane prepolymer in a liquid phase.

7. A thixotropic polyurethane composition as defined in claim 1, in which said block polyether is included in said composition in an amount of 0.01 to 50 parts by weight per 100 parts of the polyurethane.

8. A thixotropic polyurethane composition as defined in claim 1, further including an inorganic material for enhancing the thixotropic property, selected from the group consisting of finely divided silica and bentonite.

9. A thixotropic polyurethane composition as defined in claim 8, in which the amount of said inorganic material is 0.5 to 10 parts by weight with respect to 100 parts by weight of said polyurethane prepolymer included in said polyurethane composition.

10. A method for the preparation of a thixotropic polyurethane composition as defined in claim 1 which comprises mixing said block polyether compound with said liquid polyurethane prepolymer in an inert gas atmosphere and at a temperature within the range of 60° to 120°C to form a homogeneous composition system.

11. A method for the preparation of the thixotropic polyurethane composition as defined in claim 8 which comprises the steps of adding said thixotropy enhancing inorganic material to said liquid of polyurethane prepolymer in an inert gas atmosphere and at a temperature within the range of 100° to 150°C to form a dispersion system, and mixing said block polyether compound with said dispersion system in an inert gas atmosphere and at a temperature within the range of 60° to 120°C to form a homogeneous composition system.

* * * * *